May 7, 1963  E. R. ALLER  3,088,777
APPARATUS FOR STORING GRANULAR MATERIAL
Filed Sept. 26, 1961  5 Sheets-Sheet 1
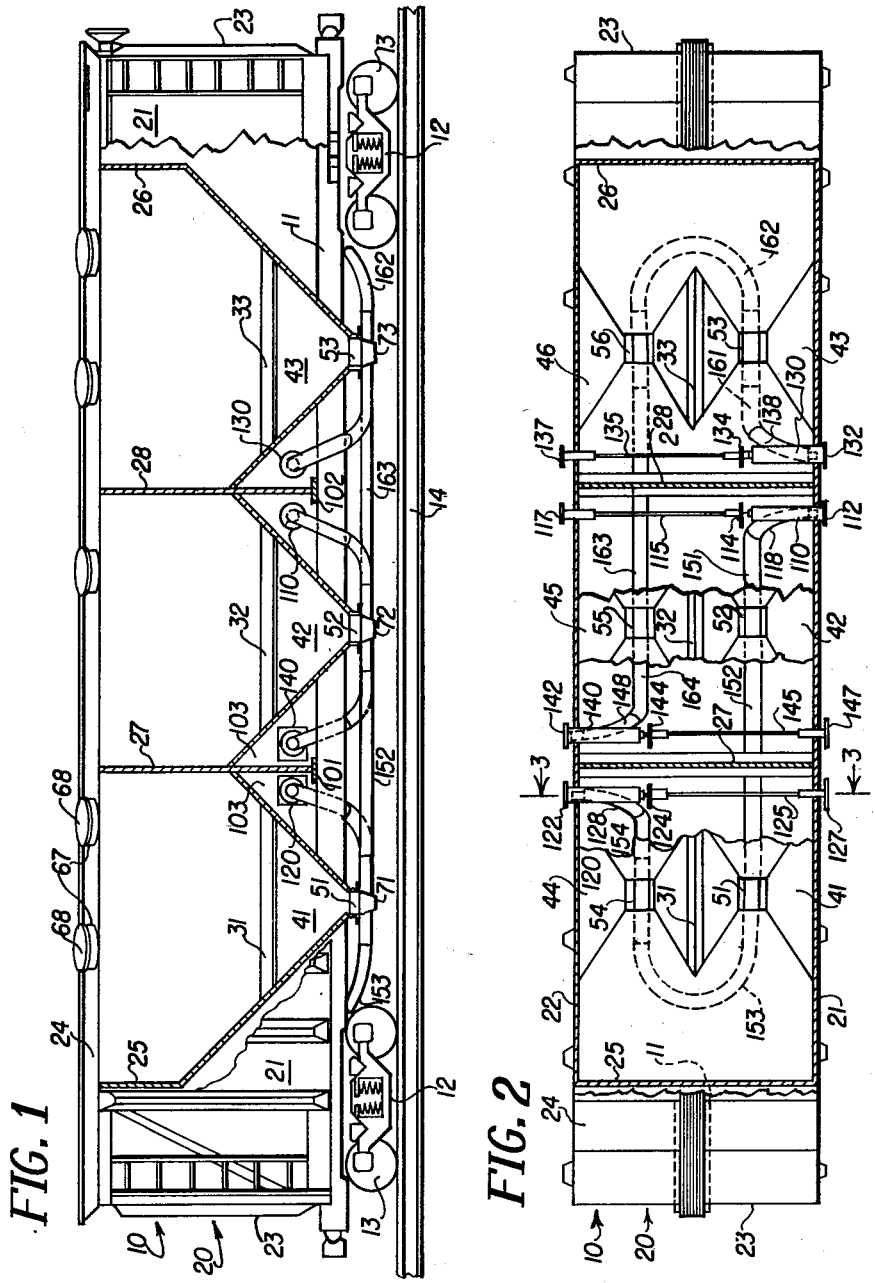
INVENTOR.
Edmund R. Aller
BY
Prangley, Baird, Clayton,
Miller & Vogel, Attys.

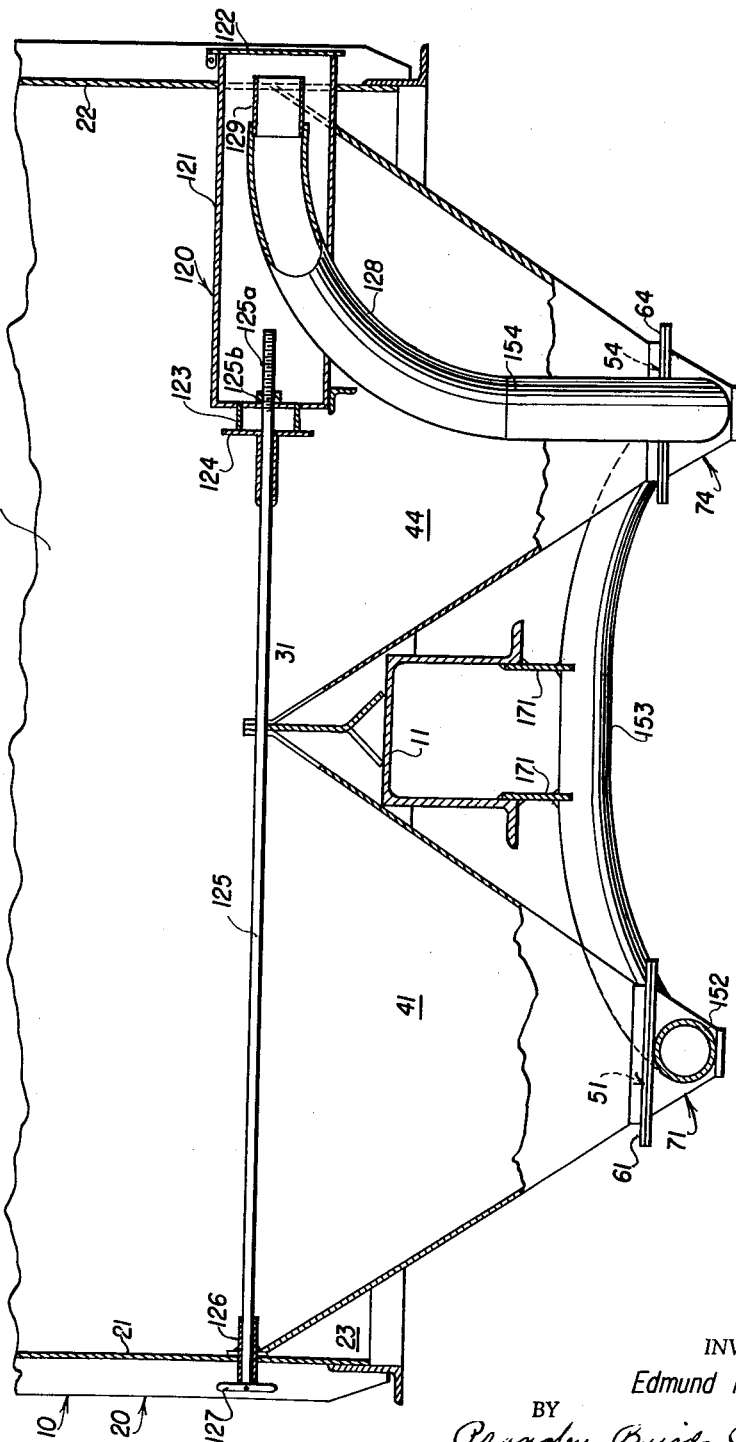

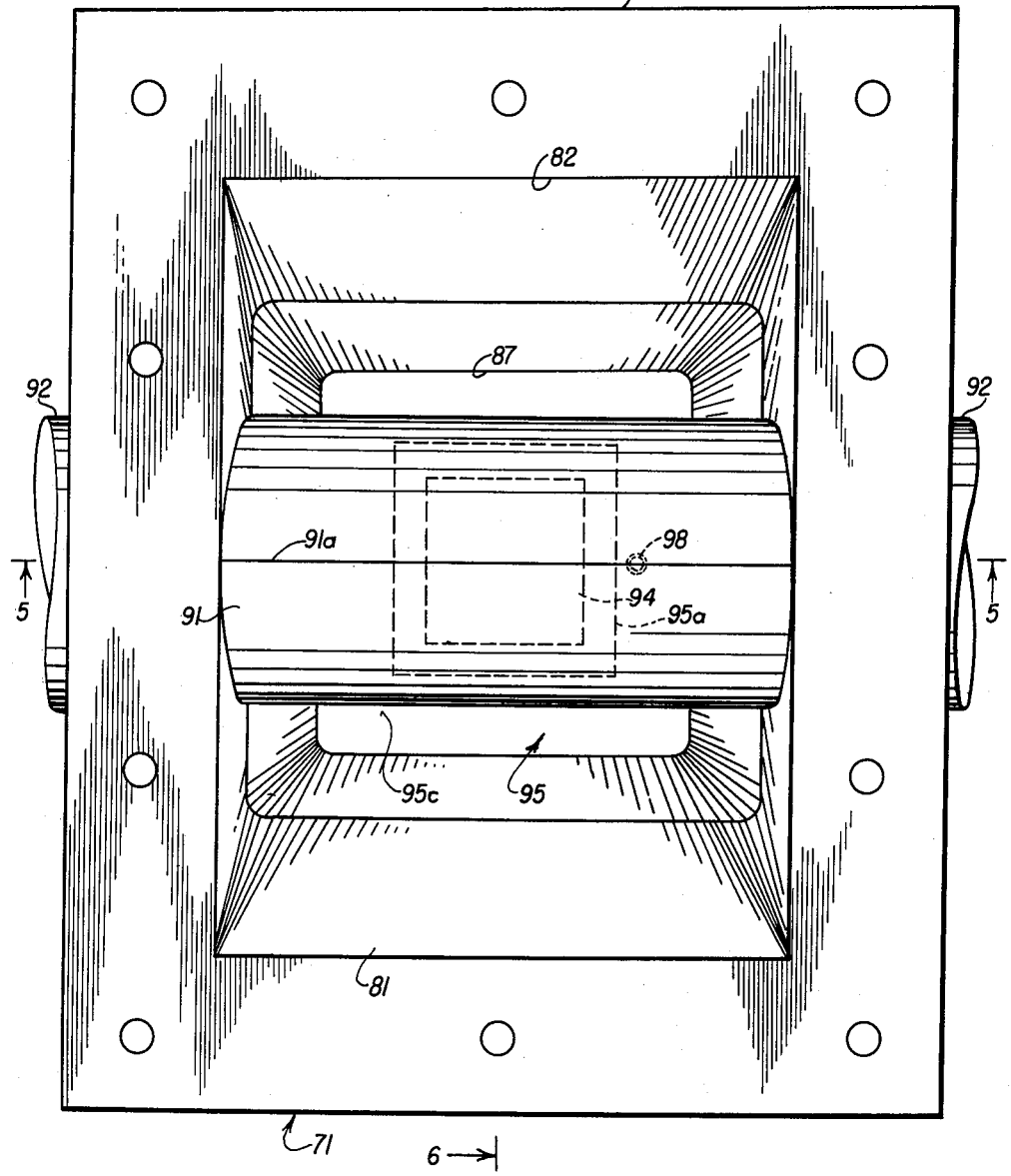

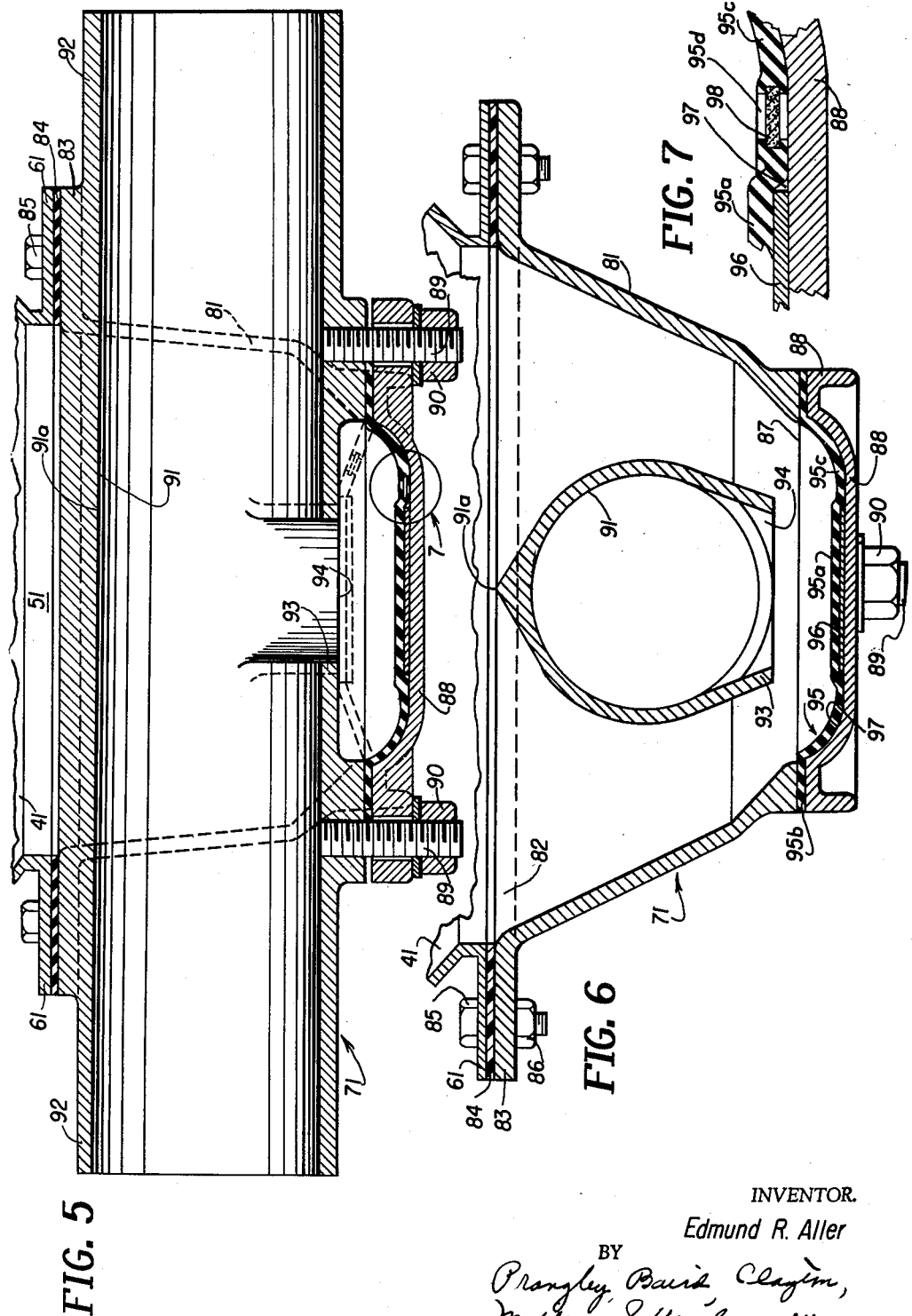

May 7, 1963 E. R. ALLER 3,088,777
APPARATUS FOR STORING GRANULAR MATERIAL
Filed Sept. 26, 1961 5 Sheets-Sheet 5

INVENTOR.
Edmund R. Aller
BY
Prangley, Baird, Clayton
Miller & Vogel
Attys.

United States Patent Office 3,088,777
Patented May 7, 1963

3,088,777
APPARATUS FOR STORING GRANULAR
MATERIAL
Edmund R. Aller, Portage, Ind., assignor to General
American Transportation Corporation, Chicago, Ill., a
corporation of New York
Filed Sept. 26, 1961, Ser. No. 140,936
11 Claims. (Cl. 302—52)

The present invention relates to apparatus for storing granular material, and more particularly to such apparatus incorporated in railway hopper cars for storing and transporting such granular material of the character of that disclosed in the copending application of Edmund R. Aller, Serial No. 85,912, filed January 30, 1961.

It is a general object of the invention to provide in apparatus for storing finely divided or granular material, such, for example, as flour, malt, plastic resin beads, or the like, an improved and simplified pneumatic unloading system so that a plurality of individual storage hoppers incorporated in the apparatus may be simultaneously unloaded through a plurality of bottom discharge outlets respectively provided therein, without interference with each other, and without overloading of the unloading system.

Another object of the invention is to provide in a railway hopper car including a body provided with structure defining a plurality of storage hoppers therein, an improved arrangement of a plurality of outlet nozzles respectively carried by the plurality of storage hoppers, and a single conduit system commonly connected to the plurality of outlet nozzles and terminating in a pair of fixtures respectively disposed at the opposite sides of the body, wherein each of the outlet nozzles incorporates automatic valve mechanism that is normally biased into its open position so long as there is grandular material to be unloaded in the associated one of the storage hoppers and that is actuated into its closed position in response to suction in the associated conduit system after all of the granular material in the associated one of the storage hoppers has been unloaded therefrom, and wherein each one of the fixtures mentioned may be selectively connected to a suction conduit for the unloading purpose, so that the granular material stores in each of the storage hoppers may be unloaded from the one fixture, and wherein the other of the fixtures mentioned may be selectively controlled to supply conveying air into the conduit system for the unloading purpose.

A further object of the invention is to provide a railway hopper car of the character described, wherein each of the outlet nozzles includes a casing provided with a bottom discharge opening therein and an associated bottom cover removably carried by the associated casing so that the granular material may be unloaded by gravity from the associated one of the storage hoppers through the casing of the outlet nozzle thereof when the bottom cover is removed from covering relation with respect to the bottom discharge opening therein.

A further object of the invention is to provide in apparatus for storing granular material including structure defining a storage hopper provided with a bottom discharge outlet, an improved outlet nozzle comprising a casing carried by the storage hopper and disposed below the bottom outlet and communicating therewith, a suction tube extending through the lower portion of the casing for unloading the granular material from the storage hopper through the casing, the intermediate section of the tube being disposed within the casing and having a valve port provided in the bottom thereof, a valve element arranged in the bottom of the casing below the valve port and cooperating therewith, whereby the interior of the tube is in communication with the lower portion of the casing when the valve element occupies its open position with respect to the valve port and the interior of the tube is cut-off from communication with the lower portion of the casing when the valve element occupies its closed position with respect to the valve port, and actuating means for selectively operating the valve element between its open and closed positions with respect to the valve port, wherein the valve element is biased into its open position with respect to the valve port so long as there is granular material in the storage hopper, and wherein the valve element is operated by the actuating means into its closed position with respect to the valve port in response to suction in the tube after all of the granular material in the storage hopper has been unloaded therefrom through the casing and into the tube.

A further object of the invention is to provide in apparatus of the character described, an improved outlet nozzle, wherein the actuating means for selectively operating the valve element between its open and closed positions with respect to the associated valve port essentially comprises a diaphragm disposed in the lower portion of the casing and operatively connected to the valve element and cooperating with the casing to define a chamber therebelow, wherein the upper side of the diaphragm is subject to the pressure in the lower portion of the casing and the lower side of the diaphragm is subject to the pressure in the chamber, and wherein a restricted passage is defined between the lower portion of the casing and the chamber and having an opening thereinto from the lower portion of the casing that is located well outwardly from the valve port and the valve element, so that the air pressure in the chamber is related to the air pressure in the lower portion of the casing at the opening into the passage from the lower portion of the casing.

A still further object of the invention is to provide in apparatus of the character described, an improved outlet nozzle of the construction set forth, wherein the chamber disposed below the diaphragm is unvented to the outside, thereby to prevent the possibility of the accumulation of foreign materials in the chamber from the outside.

A still further object of the invention is to provide in apparatus of the character described, an improved outlet nozzle of the construction set forth, wherein the restricted passage between the lower portion of the casing and the chamber is essentially defined by porous material that controls the rate of flow of the air therethrough.

A still further object of the invention is to provide in apparatus of the character described, an improved outlet nozzle of the construction set forth, wherein the restricted passage between the lower portion of the casing and the chamber is defined by a porous plug arranged in an opening formed in the diaphragm.

Further features of the invention pertain to the arrangement of the elements of the apparatus, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a side elevational view, partly broken away, of a railway hopper car embodying the present invention;

FIG. 2 is a plan view, partly broken away, of the railway hopper car shown in FIG. 1;

FIG. 3 is an enlarged vertical sectional view, partly broken away, of the railway hopper car, taken in the direction of the arrows along the line 3—3 in FIG. 2;

FIG. 4 is a greatly enlarged fragmentary plan view of one of the outlet nozzles incorporated in the railway hopper car, as shown in FIGS. 1 to 3, inclusive;

FIG. 5 is a greatly enlarged longitudinal sectional view of the outlet nozzle, taken in the direction of the arrows along the line 5—5 in FIG. 4;

FIG. 6 is a greatly enlarged lateral sectional view of the outlet nozzle, taken in the direction of the arrows along the line 6—6 in FIG. 4;

FIG. 7 is a further enlarged fragmentary sectional view of a constructional detail of the outlet nozzle, taken within the circle designated "7" in FIG. 5, and illustrating a porous plug that may be arranged in the diaphragm incorporated therein;

Figure 9:
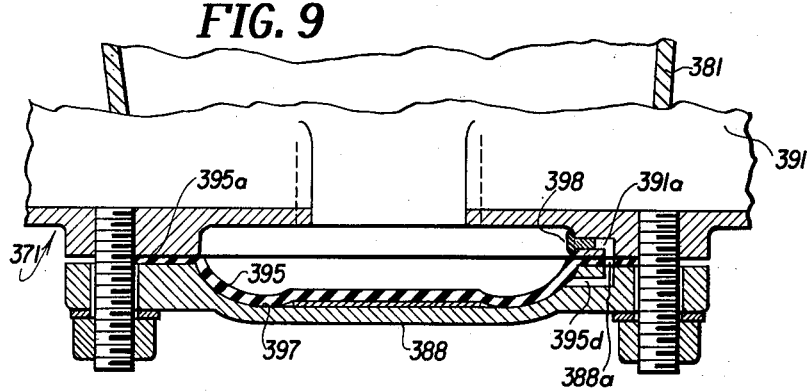
Figure 10:
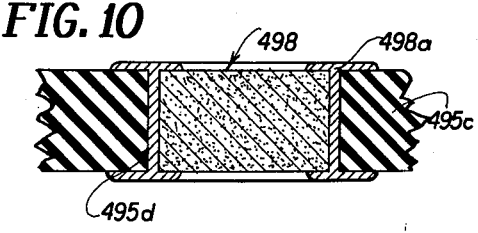

FIG. 9 is a greatly enlarged fragmentary longitudinal sectional view of the lower portion of the outlet nozzle, similar to FIG. 5, and illustrating another modified form of the actuating mechanism for the valve element incorporated therein; and FIG. 10 is a further enlarged fragmentary view, similar to FIG. 7, of a constructional detail of the outlet nozzle, and illustrating a modified form of the porous plug that may be arranged in the diaphragm incorporated therein.

Referring now to FIGS. 1 to 3, inclusive, of the drawings, the railway hopper car 10 there illustrated and embodying the features of the present invention, is especially adapted for storage and transportation of finely divided or granular materials, such, for example, as flour, malt, plastic resin beads, or the like; and the car 10 comprises a rigid underframe, including a longitudinally extending center sill 11; which underframe is supported adjacent to the opposite ends thereof by a pair of trucks 12 carrying track wheels 13 cooperating with an associated railway track, indicated at 14.

The underframe carries a body 20, including a pair of longitudinally extending and laterally spaced-apart side walls 21 and 22, a pair of laterally extending and longitudinally spaced-apart end walls 23, and a roof 24. Arranged within the body 20 are a pair of laterally extending and longitudinally spaced-apart end dividing walls 25 and 26 and a pair of laterally extending and longitudinally spaced-apart intermediate dividing walls 27 and 28, three longitudinally extending and longitudinally spaced-apart dividing bridges 31, 32 and 33, and bottom wall structure cooperating to define therein six individual storage hoppers 41, 42, 43, 44, 45 and 46. In the arrangement, the three storage hoppers 41, 42 and 43 are disposed in longitudinal spaced-apart relation on the side of the car 10 adjacent to the side wall 21, while the three storage hoppers 44, 45 and 46 are disposed in longitudinal spaced-apart relation on the side of the car 10 adjacent to the side wall 22. The two storage hoppers 41 and 44 are commonly defined by the side walls 21 and 22 and by the dividing walls 25 and 27 and are separated laterally from each other at the lower portions thereof by the longitudinally extending dividing bridge 31 disposed substantially centrally therebetween; the two storage hoppers 42 and 45 are commonly defined by the side walls 21 and 22 and by the dividing walls 27 and 28 and are separated laterally from each other at the lower portions thereof by the longitudinally extending dividing bridge 32 disposed substantially centrally therebetween; and the two storage hoppers 43 and 46 are commonly defined by the side walls 21 and 22 and by the dividing walls 26 and 28 and are separated laterally from each other at the lower portions thereof by the longitudinally extending dividing bridge 33 disposed substantially centrally therebetween.

Each of the storage hoppers 41 to 46, inclusive, is provided with individual bottom wall structure having the general configuration of an inverted frusto pyramid and terminating in a bottom discharge outlet each carrying a surrounding substantially rectangular collar. For example, as shown in FIG. 3, the downwardly tapered bottom wall structure of the individual storage hopper 41 terminates in the individual bottom discharge outlet 51 that is provided with the individual surrounding substantially rectangular collar 61, and the downwardly tapered bottom wall structure of the individual storage hopper 44 terminates in the individual bottom discharge outlet 54 that is provided with the individual surrounding substantially rectangular collar 64. In the arrangement, the bottom discharge outlets 51, etc., of the individual storage hoppers 41, etc., are disposed in a substantially horizontal common lower plane that is located well below the center sill 11 of the underframe of the car 10, as shown in FIG. 3; which lower plane is positioned appropriately above the associated railway track 14, as established by the wheels 13 of the trucks 12, for the usual road bed clearance purpose, as indicated in FIG. 1. On the other hand, the dividing bridges 31, 32 and 33 positioned at the tops of the bottom structures of the six individual storage hoppers 41 to 46, inclusive, are positioned above the center sill 11, as clearly shown in FIG. 3. Accordingly, the three individual storage hoppers 41, 42 and 43 disposed on the side of the car 10 adjacent to the side wall 21 are respectively provided with three downwardly tapered bottom wall structures that are arranged between the center sill 11 and the adjacent side wall 21 of the car 10, while the three individual storage hoppers 44, 45 and 46 disposed on the side of the car 10 adjacent to the side wall 22 are respectively provided with three downwardly tapered bottom wall structures that are arranged between the center sill 11 and the adjacent side wall 22 of the car 10.

The roof 24 carries a plurality of longitudinally spaced-apart filling hatches 67 on opposite sides thereof that respectively communicate with the individual ones of the storage hopper pairs 41, 44, 42, 45 and 43, 46; and each of the filling hatches 67 is provided with an individually associated removable hatch cover 68 normally arranged in sealed relation therewith.

Further, the body 20 of the car 10 is provided with six outlet nozzles 71 to 76, inclusive, respectively carried by the six collars 61 to 66, inclusive, and respectively communicating with the six bottom discharge outlets 51 to 56, inclusive, respectively provided in the six storage hoppers 41 to 46, inclusive. The six outlet nozzles 71 to 76, inclusive, are of identical construction and arrangement; whereby only the outlet nozzle 71 has been shown in detail in FIGS. 4 to 6, inclusive.

Referring now to FIGS. 4 to 6, inclusive, the outlet nozzle 71 comprises a hollow casing 81 terminating in an open top 82 that is surrounded by an outwardly directed substantially rectangular collar 83 that is adapted to be removably secured in place below the substantially rectangular collar 61 carried by the bottom wall structure of the storage hopper 41 disposed in surrounding relation with respect to the bottom discharge outlet 51 thereinto. More particularly, the collar 83 is arranged immediately below the collar 61 with a sealing gasket 84 therebetween and is secured in place by a plurality of bolts 85 projecting through aligned openings respectively formed in the collars 61 and 83 and in the gasket 84 and respectively carrying cooperating nuts 86. Also, the casing 81 terminates in a bottom discharge opening 87 disposed directly below the top opening 82; which bottom discharge opening 87 is normally closed by an associated removable bottom cover 88. The cover 88 is normally retained in place by a pair of threaded studs 89 respectively carrying a pair of cooperating nuts 90. The inner ends of the studs 89 are respectively received in a cooperating pair of threaded openings provided in the bottom of the casing 81 and the intermediate portions of the studs 89 respectively project through cooperating openings provided in the bottom cover 88, and the outer ends of the threaded studs 89 respectively receive the nuts 90.

Further, the outlet nozzle 71 comprises a suction tube 91 extending longitudinally therethrough and formed integrally with the casing 81; and preferably, the casing 81 and the suction tube 91 comprise an integral metal casting formed of a suitable aluminum alloy. The suction tube 91 is disposed below the rectangular collar 83 carried by the top of the casing 81 and the opposite ends 92 thereof extend well outwardly beyond the collar 83. Both of the ends 92 are open, and one of them is adapted to serve as an air inlet opening into the suction tube 91, and the other of them is adapted to serve as an air outlet opening from the suction tube 91. The intermediate section of the suction tube 91 is disposed within the casing 81 and carries at the bottom thereof a communicating downwardly directed hood 93 terminating at the bottom thereof in a valve port 94 positioned directly above the bottom discharge opening 87 into the casing 81.

Also a diaphragm 95 is arranged in the lower portion of the casing 81, and more particularly between the bottom of the casing 81 and the bottom cover 88. Specifically, the diaphragm 95 comprises a centrally disposed section 95a constituting a valve element with respect to the associated valve port 94, an outer marginal section 95b constituting a gasket element disposed between the bottom of the casing 81 and the top of the bottom cover 88, and a substantially annular intermediate section 95c constituting a flexible diaphragm proper element interconnecting the sections 95a and 95b. More particularly, the diaphragm 95 may be formed of a suitable sheet of rubber, or the like, and is arranged in covering relation with respect to the bottom discharge opening 87, the gasket element 95b thereof being clamped in place by the bottom cover 88 upon the bottom of the casing 81 in surrounding relation with the bottom discharge opening 87. Also, a metal reinforcing plate 96 is arranged below the lower side of the valve element 95a and the adjacent upper side of the bottom wall of the bottom cover 88; which metal reinforcing plate 96 is securely adhered to the adjacent lower surface of the valve element 95a for the purpose of preventing ballooning thereof into the bottom of the hood 93 through the valve port 94, when the valve element 95a occupies its closed position with respect to the valve port 94, as explained more fully hereinafter.

Also, the diaphragm 96 cooperates with the bottom 88 to define a chamber 97 therebetween; which chamber 97 communicates with the lower portion of the casing 81 adjacent to the bottom discharge opening 87 via a restricted passage formed through the diaphragm proper element 95c. As best illustrated in FIGS. 5 and 7, a hole 95d is formed through the diaphragm proper element 95c and located well outwardly from both the valve port 94 and the valve element 95a and positioned below the bottom of the intermediate section of the suction tube 91 disposed within the casing 81; and arranged within the hole 95d is a button-like plug 98 formed of porous material thereby to define the previously mentioned restricted passage between the lower portion of the casing 81 and the chamber 97 disposed below the diaphragm 95. More specifically, the button-like plug 98 may be formed of porous material selected from the class consisting of ceramic materials, plastic materials, and sintered metal oxide materials.

In view of the foregoing, it will be understood that the interior of the storage hopper 41 is in communication through the bottom discharge outlet 51 with the interior of the casing 81 of the outlet nozzle 71. In turn, the interior of the suction tube 91 communicates with the interior of the hood 93; and the interior of the hood 93 selectively communicates with the interior of the lower portion of the casing 81 through the valve port 94 depending upon the position of the valve element 95a. More particularly, the valve element 95a occupies a normal lower open position with respect to the valve port 94 when the diaphragm 96 occupies its normal lower position, as illustrated in FIGS. 5 and 6. On the other hand, the valve element 95a occupies an operated upper closed position with respect to the valve port 94, as indicated in dotted lines in FIG. 5, when the diaphragm 96 occupies its actuated upper position. Also, as illustrated in FIGS. 5 and 6, when the valve element 95a occupies its open position with respect to the valve port 94, the bottom of the hood 93 is in open communication with the lower portion of the casing 81; and when the valve element 95a occupies its closed position with respect to the valve port 94, the communication between the bottom of the hood 93 and the interior of the casing 81 is cut-off or closed. Also, it will be understood that when the storage hopper 41 contains granular material, the same falls through the bottom discharge outlet 51 into the casing 81 and accumulates upon the upper surfaces of the valve element 95a and the diaphragm proper element 95c; whereby the valve element 95a and the diaphragm proper element 95c are subject to the weight of granular material in the casing 81 so long as there is granular material in the storage hopper 41, thereby to bias and to maintain the valve element 95a in its open position with respect to the valve port 94. As explained more fully hereinafter, the granular material from the storage hopper 41 is unloaded via the casing 81 of the outlet nozzle 71 through the suction tube 91, the granular material proceeding from the casing 81 through the valve port 94, with the valve element 95a in its open position, and thence through the hood 93 into the suction tube 91. Of course, it will be understood that in this unloading operation, suction is maintained in one end 92 of the suction tube 91 and conveying air is supplied at the other end 92 of the suction tube 91. After all of the granular material has been unloaded from the storage hopper 41 and from the casing 81 of the associated outlet nozzle 71, continued suction in the suction tube 91 causes the valve element 95a to be operated from its lower open position with respect to the valve port 94 into its upper closed position with respect to the valve port 94 by virtue of a Bernoulli effect that is produced in the lower portion of the casing 81 and between the valve element 95a and the bottom of the hood 93 in the immediate area of the valve port 94, as explained more fully below. Accordingly, it will be understood that in response to suction in the suction tube 91 and the consequent suction in the lower portion of the casing 81, after all of the granular material in the storage hopper 41 has been unloaded therefrom, the valve element 95a is automatically operated by the diaphragm proper element 95c from its open position into its closed position with respect to the valve port 94, whereby the communication between the interior of the suction tube 91 and the interior of the casing 81 is cut-off or closed.

More particularly, in the absence of suction in the suction tube 91, concurrently with or without granular material in the lower portion of the casing 81, the upper side of the valve element 95a and the upper side of the diaphragm proper element 95c and the hole 95d in the diaphragm proper element 95c are subject to atmospheric pressure so that the chamber 97 disposed below the diaphragm 95 is also subject to atmospheric pressure, with the result that the diaphragm proper element 95c is operated into its lower position moving the valve element 95a into its lower or open position with respect to the valve port 94. On the other hand, suction in the suction tube 91, concurrently with the presence of granular material in the lower portion of the casing 81, subjects the upper side of the valve element 95a and the upper side of the diaphragm proper element 95c and the hole 95d in the diaphragm proper element 95c to relatively low air pressure (substantially below atmospheric pressure) so that the chamber 97 is also subject to the relatively low air pressure, with the result that the diaphragm proper element 95c is operated into its lower position moving the valve element 95a into its lower or open position with respect to the valve port 94. Still on the other hand, suction in the suction tube 91, concurrently with the absence of granular material in the lower portion of the casing 81, subjects the upper side of the valve element 95a to relatively low air pressure (substantially below atmospheric pressure), and subjects the upper side of the diaphragm proper element 95c and the hole 95d in the diaphragm proper element 95c to relatively high air pressure (only slightly below atmospheric pressure), so that the chamber 97 is also subject to the relatively high air pressure, with the result that the diaphragm proper element 95c is operated into its upper position moving the valve element 95a into its upper or closed position with respect to the valve port 94. Under the last-mentioned conditions, the upper side of the valve element 95a is subjected to the relatively low air pressure mentioned, while the upper side of the diaphragm proper element 95c is subjected to the relatively high air pressure mentioned by virtue of the Bernoulli effect as a consequence of the air rushing through the restricted orifice defined between the bottom of the hood 93 and the top side of the valve element 95a.

Moreover, the arrangement of the diaphragm proper element 95c not only constitutes mechanism for selectively actuating the valve element 95a between its open and closed positions with respect to the valve port 94, as described above, but the provision of the porous plug 98 in the hole 95d formed through the diaphragm proper element 95c serves as an air check valve preventing sudden movements of the diaphragm proper element 95c between its upper and lower positions, thereby to prevent flutter of the valve element 95a between its closed and open positions with respect to the valve port 94.

Also, it will be understood that the granular material in the storage hopper 41 may be directly unloaded by gravity through the bottom discharge opening 87 in the casing 81 by the removal of the bottom cover 88 from its normal closed position with respect to the bottom discharge outlet 87. More particularly, the bottom cover 88 may be removed from covering relation with respect to the bottom discharge pening 87 by removal of one of the nuts 90 from the associated one of the threaded studs 89 and by loosening of the other of the nuts 90 with respect to the associated other threaded stud 89, the bottom cover 88 being rotated about the retaining one of the threaded studs 89 from its covering position with respect to the bottom discharge opening 87. Of course, this gravity unloading of the storage hopper 41 through the casing 81 of the outlet nozzle 71, with the bottom cover 88 in its open position, is altogether independent of the pneumatic unloading thereof utilizing the suction tube 91 in the manner previously explained. At this point, it is noted that the crest of the intermediate portion of the suction tube 91 extending longitudinally through the casing 81 of the outlet nozzle 71 is provided with a general pyramidal configuration in lateral section, as indicated at 91a, so as to facilitate the downward slide of the granular material from the storage hopper 41 through the casing 81 and regardless of whether pneumatic unloading or gravity unloading of the granular material through the outlet nozzle 71 is employed.

Again referring to FIGS. 1 and 3 of the drawings, it is pointed out that the tapered bottom structures of the storage hoppers 41 to 46, inclusive, are reinforced by foot structures 101 and 102 respectively carried by the lower ends of the dividing walls 27 and 28; which foot structures are supported directly upon the upper surface of the center sill 11. Also, the tapered bottom structures of the storage hoppers 41 to 46, inclusive, are reinforced by a plurality of substantially triangular gusset plates 103 that are secured to the adjacent sides of the center sill 11, as best shown in FIG. 1.

Further, the body 20 carries a first laterally extending tubular fixture 110 disposed adjacent to the side wall 21 and below the tapered bottom structure of the storage hopper 42, a second laterally extending tubular fixture 120 disposed adjacent to the side wall 22 and below the tapered bottom structure of the storage hopper 44, a third laterally extending tubular fixture 130 disposed adjacent to the side wall 21 and below the tapered bottom structure of the storage hopper 43, and a fourth laterally extending tubular fixture 140 disposed adjacent to the side wall 22 and below the tapered bottom structure of the storage hopper 45. The two tubular fixtures 110 and 130 are disposed on opposite sides of the lower portion of the dividing wall 28 and well above the center sill 11; and the two tubular fixtures 120 and 140 are disposed on opposite sides of the lower portion of the dividing wall 27 and well above the center sill 21. More specifically, the four tubular fixtures 110, 120, 130 and 140 are located in an upper substantially horizontal common plate disposed well above the lower plane of the bottom discharge outlets 51 to 56, inclusive, of the storage hoppers 41 to 46, inclusive, as best shown in FIGS. 1 and 3.

The tubular fixtures 110, 120, 130 and 140 are of identical construction; and as best shown in FIG. 3, the tubular fixture 120 comprises a laterally extending casing 121, the outer end of which projects through the adjacent side wall 22 of the car 10 and is provided with a hinged cover 122 that is movable between closed and open positions with respect thereto and that is readily accessible from the exterior. The inner end of the casing 121 is provided with an air inlet throat 123, in cooperating relation with which there is arranged an air inlet member or valve 124 that is selectively movable into closed and open positions with respect thereto. The air inlet valve 124 is carried by an elongated laterally extending control rod 125 that is mounted for rotation in a fixture 126 that is carried by the side wall 22, the extreme outer end of the control rod 126 carrying a manually operable handwheel 127. The extreme inner end of the control rod 125 is threaded, as indicated at 125a and cooperates with an associated nut 125b that is carried by the inner end of the casing 121. Accordingly, it will be understood that upon selective rotation of the handwheel 127, corresponding rotation may be imparted to the control rod 125; whereby the valve element 124 may be selectively moved into open and closed positions with respect to the associated air inlet throat 123. Also, the tubular fixture 120 comprises an air inlet tube 128 that projects from the exterior through the side of the casing 121; which tube 128 terminates in an air inlet throat 129 disposed inwardly with respect to the hinged cover 122 and communicating with the exterior of the casing 121.

In view of the foregoing, it will be understood that the tubular fixture 140 is provided with the hinged cover 142 disposed exteriorly of the side walls 22, while the tubular fixtures 110 and 130 are respectively provided with the hinged covers 112 and 132 disposed exteriorly of the side wall 21. Also, the handwheel 147 for selectively operating the air inlet valve 144 of the tubular fixture 140 is disposed adjacent to the side wall 21, while the handwheels 117 and 137 for selectively operating the respective air inlet valves 114 and 134 of the respective tubular fixtures 110 and 130 are disposed adjacent to the side wall 22. The laterally extending control rods 145, 115 and 135 respectively connecting the handwheels 147, 117 and 137 and the inlet valve elements 144, 114 and 134 are illustrated in FIG. 2; and likewise, the tubular fixtures 140, 110 and 130 respectively comprise the air inlet tubes 148, 118 and 138, as shown in FIG. 2.

Further, as best shown in FIGS. 1 and 2, the car 10 comprises a first conduit system interconnecting the tubular fixtures 110 and 120 via the outlet nozzles 72, 71 and 74 in series relation, and a second conduit system interconnecting the tubular fixtures 130 and 140 via the outlet nozzles 73, 76 and 75 in series relation. Specifically, the outlet tube 118 of the tubular fixture 110 is connected via a conduit section 151 to one end of the suction tube of the outlet nozzle 72; the other end of the suction tube of the outlet nozzle 72 is connected via a conduit section 152 to one end of the suction tube of the outlet nozzle 71; the other end of the suction tube of the outlet nozzle 71 is connected via a conduit section 153 to one end of the suction tube of the outlet nozzle 74; and the other end of the suction tube of the outlet nozzle 74 is connected via a conduit section 154 to the outlet tube 128 of the tubular fixture 120. Similarly, the outlet tube 138 of the tubular fixture 130 is connected via a conduit section 161 to one end of the suction tube of the outlet nozzle 73; the other end of the suction tube of the outlet nozzle 73 is connected via a conduit section 162 to one end of the suction tube of the outlet nozzle 76; the other end of the suction tube of the outlet nozzle 76 is connected via a conduit section 163 to one end of the suction tube of the outlet nozzle 75; and the other end of the suction tube of the outlet nozzle 76 is connected via a conduit section 164 to the outlet tube 148 of the tubular fixture 140.

In the arrangement, the conduit sections 151, etc., may be formed of any suitable material, such, for example, as steel tubing. Also, the conduit sections 151, etc., where required, are suitably braced with respect to the underframe of the car 10. For example, as illustrated in FIG. 3, the conduit section 153 is suitably secured to the center sill 11 employing a pair of plates 171 respectively welded to two laterally spaced-apart lower portions of the center sill 11 and respectively welded to two laterally spaced-apart upper portions of the conduit section 153.

Considering now the pneumatic unloading of the granular material from the storage hoppers 42, 41 and 44, it is noted that this unloading may be effected from either side of the car 10 utilizing the appropriate one of the tubular fixtures 110 or 120. Likewise, the granular material may be pneumatically unloaded from the storage hoppers 43, 46 and 45 utilizing the appropriate one of the tubular fixtures 130 or 140. Assuming that the unloading mentioned is to take place with respect to the storage hoppers 42, 41 and 44, and is to be carried out from the side of the car 10 adjacent to the side wall 22, the tubular fixture 120 is employed. More particularly, the hinged cover 122 carried by the outer end of the tubular fixture 120 is operated in its open position; and a suction conduit, not shown, is connected to the outlet throat 129 that is adapted detachably to receive the same. Also, the handwheel 117 disposed on the side of the car 10 adjacent to the side wall 22 is manipulated so as to operate the air inlet valve 114 into its open position with respect to the associated inlet throat member 113 provided at the inner end of the tubular fixture 110, so as to accommodate the admission of conveying air into the tubular fixture 110. When the suction machine, not shown, is operated to produce suction in the suction conduit, not shown, that is connected to the tubular fixture 120, a suction condition is effected in the tubular member 120 and consequently via the first conduit system mentioned back to the tubular fixture 110. Also at this time, ordinarily several of the hatch covers 68 are removed from the associated hatches 67 so as to admit conveying air into the top of the storage hoppers 42, etc. The suction condition mentioned effects the flow of conveying air from the exterior through the inlet throat member 113 with the associated inlet valve 114 in its open position and thence into the casing 111 of the tubular member 110. The conveying air then flows through the outlet throat element 129 through the outlet tube 118 and thence via the first mentioned conduit system into the outlet tube 128 and ultimately through the outlet throat member 129 into the connected suction conduit. The first mentioned conveying system through which the suction condition is maintained, as described above, includes the three outlet nozzles 72, 71 and 74 in series relation, as well as the series connected conduit sections 151, 152, 153 and 154. This suction in the first conduit system mentioned effects unloading of the storage hoppers 42, 41 and 44 through the respective bottom discharge outlets 52, 51 and 54 and through the respective outlet nozzles 72, 71 and 74, since the valve element in each of the outlet nozzles 71, etc., occupies its open position at this time, as previously explained. Accordingly, the three storage hoppers 42, 41 and 44 are simultaneously unloaded through the first conduit system mentioned into the tubular fixture 120 and thence into the connected suction conduit, not shown.

When any one of the three storage hoppers 42, 41 or 44 is completely unloaded, the valve element in the associated outlet nozzle 72, 71 or 74 is operated into its closed position with respect to the valve port in the associated suction tube, in the manner previously explained, thereby to cut-off the communication between the empty storage hopper 42, etc., and the associated first conduit system, so that the granular material in the other two of the three storage hoppers noted may be subsequently completely unloaded. When all three of the storage hoppers 42, 41 and 44 connected to the first conduit system mentioned are unloaded, all three of the valve elements incorporated in the three outlet nozzles 72, etc., are operated into their closed positions with respect to the valve ports in the associated suction tubes incorporated in the outlet nozzles 72, etc.; whereby the suction machine, not shown, may be shut-down and the suction conduit, not shown, may be disconnected from the outlet throat member 129 incorporated in the tubular fixture 120. At this time, the hinged cover 122 is returned back into its closed position and the handwheel 117 is manipulated so as to return the valve element 114 back into its closed position with respect to the throat member 113 incorporated in the tubular fixture 110.

In view of the foregoing description of the unloading of the three storage hoppers 42, 41 and 44 from the tubular fixture 120 disposed adjacent to the side wall 22 of the car 10, it will be understood that these three storage hoppers may be unloaded in a substantially identical manner from the tubular fixture 110 disposed adjacent to the side wall 21 of the car 10. In this case, the suction conduit, not shown, is operatively connected to the outlet throat member 119 incorporated in the tubular fixture 110 and the manual valve 127 is manipulated to operate the inlet valve element 124 into its open position with respect to the inlet throat member 123 incorporated in the tubular fixture 120.

Moreover, it will be appreciated that the unloading of the three storage hoppers 43, 46 and 45 may be carried out in a substantially identical manner from either side of the car 10 utilizing the appropriate one of the tubular fixtures 130 or 140, in the manner explained above.

Furthermore, it will be appreciated that the two groups of storage hoppers may be simultaneously unloaded from either side of the car 10 by the connection of two of the suction conduits, not shown, to the two corresponding tubular fixtures 110, 130 or 120, 140 in an obvious manner; and at this point, it is noted that it is common practice at an unloading station to provide a plurality of suction unloading machines and a corresponding plurality of suction conduits; whereby simultaneous unloading of the two groups of storage hoppers incorporated in the car 10 may be readily carried out.

Again referring to FIGS. 4 to 6, inclusive, it is pointed out that each of the outlet nozzles 71, etc. is self-regulating with respect to the rate of supply of the granular material from the associated storage hopper 41, etc. into the first conveying system. This action may be readily understood in conjunction with the mode of operation of the outlet nozzle 71, assuming that the granular material is being unloaded via the tubular fixture 120 from the three storage hoppers 42, 41 and 44. In this case, the flow of the granular material through the suction tube 91 is from the right-hand end 92 thereof toward the left-hand end 92 thereof, as shown in FIG. 5; and in the event substantial granular material is being supplied into the first conveying system from the preceding storage hopper 42, there will be substantial movement of the granular material through the suction tube 91 from the right-hand end 92 thereof toward the left-hand end 92 thereof, with the result that there will be substantial movement of the granular material over the top of the hood 93 so that the suction effected through the hood 93 into the lower portion of the casing 81 of the outlet nozzle 71 is correspondingly reduced. This reduction of the suction in the hood 93 correspondingly reduces the rate at which granular material is added into the first conveying system from the storage hopper 41 through the casing 81 of the outlet nozzle 71. Accordingly, the arrangement renders the outlet nozzle 71 self-regulating with respect to the rate of supply of granular material from the storage hopper 41 into the first conveying system. This same regulation takes place in each of the other outlet nozzles 72 and 74 connected to the first conduit system, thereby preventing unloading of the first conduit system and consequently of the suction conduit connected to the tubular fixture 120 in the present example. Of course, the same regulation takes place in the outlet nozzles 73, 76 and 75 that are connected to the second conduit system.

Figure 8:
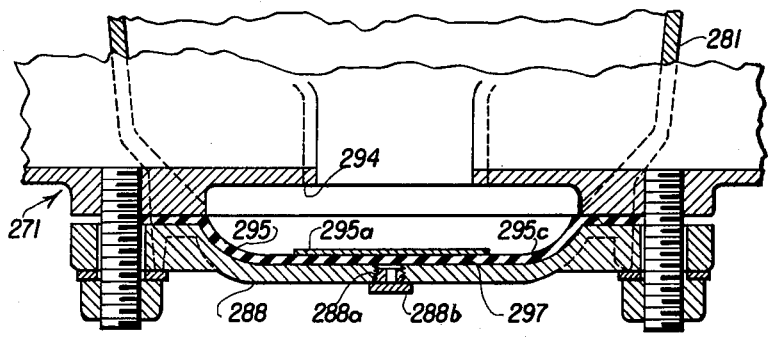
FIG. 8 is a greatly enlarged fragmentary longitudinal sectional view of the lower portion of the outlet nozzle, similar to FIG. 5, and illustrating a modified form of the actuating mechanism for the valve element incorporated therein.

Referring now to FIG. 8, a modified form of the outlet nozzle 271 is there illustrated that is substantially identical to the above-described outlet nozzle 71 illustrated in FIGS. 4 to 7, inclusive; however, in this case, the diaphragm 295 is disposed directly adjacent to the bottom cover 288 and carries adjacent to the central portion of the upper side thereof a separate valve element 295a that directly cooperates with the associated valve port 294. The valve element 295a is formed of a suitable piece of metal and is directly adhered to the upper surface of the central portion of the diaphragm 295 utilizing a suitable cement. Also in the outlet nozzle 271, a threaded opening 288a is provided in the central portion of the bottom cover 288; which threaded opening 288a receives a removable threaded plug 288b. This arrangement renders the chamber 297 disposed between the diaphragm 295 and the bottom cover 288 accessible from the exterior, upon removal of the threaded plug 288b.

In this construction, the diaphragm 295 is formed essentially of flexible microporous plastic material, such, for example, as the polyvinyl chloride sheet material disclosed in U.S. Patent No. 2,542,527, granted on February 20, 1951, to Eric M. O. Honey and Charles R. Hardy, and sold commercially by The Electric Storage Battery Company. Accordingly, the diaphragm proper element 295c constitutes a restricted passage between the lower portion of the casing 281 and the chamber 297 defined between the diaphragm 295 and the bottom cover 288. Of course, it will be understood that the central portion of the diaphragm 295 that is covered by the valve element 295a is imperforate by virtue of the imperforate construction of the metal valve element 295a.

The fundamental principle of operation of the outlet nozzle 271 is the same as that previously described in conjunction with the outlet nozzle 71, since the Bernoulli effect that is produced in the lower portion of the casing 281 after unloading of all of the granular material therefrom and as a consequence of the inrush of the air into the valve port 294 at this time will subject the diaphragm proper element 295c to a relatively high air pressure simultaneously without subjecting the valve element 295a to a relatively low air pressure. Of course, when the diaphragm proper element 295c is subjected to the relatively high air pressure mentioned, the chamber 297 is subjected to the relatively high air pressure mentioned by virtue of the microporous character of the material of the diaphragm proper element 295c. Accordingly, in the outlet nozzle 271, the diaphragm proper element 295c constitutes mechanism for selectively operating the valve element 295a between open and closed positions with respect to the associated valve port 294 and prevents flutter of the valve element 295a between its open and closed positions mentioned, all in the manner previously described.

Referring now to FIG. 9, another modified form of the outlet nozzle 371 is there illustrated that is substantially identical to the above described outlet nozzle 71 illustrated in FIGS. 4 to 7, inclusive; however, in this case, the restricted passage that is formed between the lower portion of the casing 381 and the chamber 397 that is defined between the diaphragm 395 and the bottom cover 388 is formed entirely independently of the diaphragm 395. More particularly in this case, two passages 391a and 388a are respectively formed in the bottom portion of the suction tube 391 and in the top portion of the bottom cover 388; which passages 391a and 388a communicate with each other through a hole 395d formed in the gasket element 395a of the diaphragm 395. The outer end of the passage 391a communicates with the lower portion of the casing 381 and receives a porous plug 398 of the character previously described; while the outer end of the passage 388a communicates directly with the chamber 397 disposed between the diaphragm 395 and the bottom cover 388. Hence, the lower portion of the casing 381 is in communication with the chamber 397 via the porous plug 398 and the passages 391a and 388a and the hole 395d.

It will be understood that the mode of operation of the outlet nozzle 371 is the same as that of the outlet nozzle 71 as previously described; and, of course, in this case the diaphragm 395 is formed of imperforate flexible material.

Referring now to FIG. 10, there is illustrated a modified form of the porous plug 498 that is incorporated in the hole 395d that is provided in the diaphragm proper element 495c that may be incorporated in the outlet nozzle 71, as illustrated in FIGS. 4 to 6, inclusive. More particularly, in this construction the porous plug 498 is formed of porous material of the character previously described and is arranged internally of an associated metal grommet 498a that, in turn, is secured in place in the hole 495d formed in the diaphragm proper element 495c. This arrangement is very advantageous by virtue of the fact that the preformed porous plug 498 and the associated grommet 498a may be readily snapped in place in the preformed hole 495d provided through the diaphragm proper element 495c in a ready and simple manner.

Of course, the mode of operation of the outlet nozzle 71 incorporating the modified form of the porous plug 498, as shown in FIG. 10, is the same as that previously described.

In view of the foregoing, it is apparent that there has been provided in apparatus for storing granular material, an outlet nozzle of improved construction and arrangement incorporating an automatically operated valve for selectively controlling the communication between the casing thereof and the suction tube thereof in response to respective loaded and unloaded conditions of the connected storage hopper. Also, there has been provided in a railway hopper car, an improved and simplified combination gravity unloading and pneumatic unloading system, wherein each of the plurality of storage hoppers incorporated therein may be individually unloaded on a gravity basis, and wherein each of the plurality of storage hoppers incorporated therein may be simultaneously unloaded on a pneumatic basis. In the system, when the pneumatic unloading arrangement is employed, all of the storage hoppers may be simultaneously unloaded from either side of the railway car, utilizing the corresponding two of the four tubular fixtures respectively disposed on the opposite sides of the car body.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In apparatus for storing granular material including structure defining a storage hopper provided with a bottom discharge outlet; an outlet nozzle comprising a casing carried by said storage hopper and disposed below said bottom outlet and communicating therewith, a suction tube extending through the lower portion of said casing for unloading the granular material from said storage hopper through said casing, one end of said tube providing an air inlet opening thereinto and the other end of said tube providing an air outlet opening therefrom, the intermediate section of said tube being disposed within said casing and having a valve port provided in the bottom thereof, a valve element arranged in the lower portion of said casing below said valve port and cooperating therewith, whereby the interior of said tube is in communication with the lower portion of said casing when said valve element occupies its open position with respect to said valve port and the interior of said tube is cut-off from communication with the lower portion of said casing when said valve element occupies its closed position with respect to said valve port, a fixture communicating with said other end of said tube and adapted to be connected to a suction conduit, whereby conveying air may be supplied through said air inlet opening into said tube and then through said air outlet opening into the suction conduit connected to said fixture with the result that the granular material in said storage hopper is unloaded therefrom into said casing and proceeds therefrom through said valve port with said valve element in its open position and into said tube and is thus conveyed with the conveying air in said tube into the suction conduit connected to said fixture, and mechanism for selectively actuating said valve element between its open and closed positions with respect to said valve port; said mechanism comprising a diaphragm arranged in the lower portion of said casing in supporting and surrounding relation with said valve element, the inner perimeter of said diaphragm being sealed to said valve element and the outer perimeter of said diaphragm being sealed to said casing thereby to define a chamber below said valve element and said diaphragm and above the bottom of said casing, said diaphragm having a lower position actuating said valve element into its open position with respect to said valve port and an upper position actuating said valve element into its closed position with respect to said valve port, the upper side of said valve element and the upper side of said diaphragm being subject to the air pressure in the lower portion of said casing and the lower side of said valve element and the lower side of said diaphragm being subject to the air pressure in said chamber, the upper side of said valve element and the upper side of said diaphragm also being subject to the weight of granular material in the lower portion of said casing so long as there is granular material in said storage hopper to be unloaded therefrom, and means defining a restricted passage between the lower portion of said casing and said chamber, the opening into said passage in the lower portion of said casing being located well outwardly from said valve port and said valve element, whereby the absence of suction in the tube concurrently with or without granular material in the lower portion of said casing subjects the upper side of said valve element and the upper side of said diaphragm and said opening into said passage to relatively high air pressure so that said chamber is subject to relatively high air pressure with the result that said diaphragm is operated into its lower position, and whereby suction in said tube concurrently with the presence of granular material in the lower portion of said casing subjects the upper side of said valve element and the upper side of said diaphragm and said opening into said passage to relatively low air pressure so that said chamber is subject to relatively low air pressure with the result that said diaphragm is operated into its lower position, and whereby suction in said tube concurrently with the absence of granular material in the lower portion of said casing subjects the upper side of said valve element to relatively low air pressure and subjects the upper side of said diaphragm and said opening into said passage to relatively high air pressure so that said chamber is subject to relatively high air pressure with the result that said diaphragm is operated into its upper position.

2. The apparatus for storing granular material set forth in claim 1, wherein said restricted passage between the lower portion of said casing and said chamber is defined through said diaphragm.

3. The apparatus for storing granular material set forth in claim 1, wherein said restricted passage between the lower portion of said casing and said chamber is defined through said diaphragm and is positioned below the section of said tube disposed within said casing.

4. The apparatus for storing granular material set forth in claim 1, wherein said restricted passage between the lower portion of said casing and said chamber is defined outwardly from said diaphragm and independently thereof.

5. The apparatus for storing granular material set forth in claim 1, wherein said diaphragm is formed essentially of flexible microporous plastic material thereby to define therethrough said restricted passage between the lower portion of said casing and said chamber.

6. The apparatus for storing granular material set forth in claim 1, wherein said restricted passage between the lower portion of said casing and said chamber is defined essentially by a porous plug arranged in a hole provided through said diaphragm.

7. In apparatus for storing granular material including structure defining a storage hopper provided with a bottom discharge outlet; an outlet nozzle comprising a casing carried by said storage hopper and disposed below said bottom outlet and communicating therewith, said casing having a bottom opening therein, a bottom cover removably carried by said casing and normally closing said bottom opening, a suction tube extending through the lower portion of said casing for unloading the granular material from said storage hopper through said casing, one end of said tube providing an air inlet opening thereinto and the other end of said tube providing an air outlet opening therefrom, the intermediate section of said tube being disposed within said casing and having a valve port provided in the bottom thereof, a sheet-like member arranged in covering relation with said bottom opening and adjacent to the upper side of said bottom cover, said member including a central portion disposed below said valve port and constituting a valve element cooperating therewith, said member also including an outer boundary portion disposed between the bottom of said casing and the outer portion of said bottom cover and constituting a sealing gasket with respect thereto, said member further including an intermediate portion disposed between said central portion and said outer boundary portion and constituting a diaphragm accommodating selective movements of said valve element into open and closed positions with respect to said valve port, whereby the interior of said tube is in communication with the lower portion of said casing when said valve element occupies its open position with respect to said valve port and the interior of said tube is cut-off from communication with the lower portion of said casing when said valve element occupies its closed position with respect to said valve port, a fixture communicating with said other end of said tube and adapted to be connected to a suction conduit, whereby conveying air may be supplied through said air inlet opening into said tube and then through said air outlet opening into the suction conduit connected to said fixture with the result that the granular material in said storage hopper is unloaded therefrom into said casing and proceeds therefrom through said valve port with said valve element in its open position and into said tube and is thus conveyed with the conveying air in said tube into the suction conduit connected to said fixture, said member cooperating with said bottom cover to define a chamber therebetween, said diaphragm having a lower position actuating said valve element into its open position with respect to said valve port and an upper position actuating said valve element into its closed position with respect to said valve port, the upper side of said valve element and the upper side of said diaphragm being subject to the air pressure in the lower portion of said casing and the lower side of said valve element and the lower side of said diaphragm being subject to the air pressure in said chamber, the upper side of said valve element and the upper side of said diaphragm also being subject to the weight of granular material in the lower portion of said casing so long as there is granular material in said storage hopper to be unloaded therefrom, and means defining a restricted passage between the lower portion of said casing and said chamber, the opening into said passage in the lower portion of said casing being located well outwardly from said valve port and said valve element, whereby the absence of suction in said tube concurrently with or without granular material in the lower portion of said casing subjects the upper side of said valve element and the upper side of said diaphragm and said opening into said passage to relatively high air pressure so that said chamber is subject to relatively high air pressure with the result that said diaphragm is operated into its lower position, and whereby suction in said tube concurrently with the presence of granular material in the lower portion of said casing subjects the upper side of said valve element and the upper side of said diaphragm and said opening into said passage to relatively low air pressure so that said chamber is subject to relatively low air pressure with the result that said diaphragm is operated into its lower position, and whereby suction in said tube concurrently with the absence of granular material in the lower portion of said casing subjects the upper side of said valve element to relatively low air pressure and subjects the upper side of said diaphragm and said opening into said passage to relatively high air pressure so that said chamber is subject to relatively high air pressure with the result that said diaphargm is operated into its upper position.

8. The apparatus for storing granular material set forth in claim 7, and further comprising a rigid plate secured to said valve element and movable therewith so as to reinforce the same in order to prevent distention of said valve element through said valve port into said tube when said valve element occupies its closed position with respect to said valve port.

9. In apparatus for storing granular material including structure defining a storage hopper provided with a bottom discharge outlet; an outlet nozzle comprising a casing carried by said storage hopper and disposed below said bottom outlet and communicating therewith, said casing having a bottom opening therein, a bottom cover removably carried by said casing and normally closing said bottom opening, a suction tube extending through the lower portion of said casing for unloading the granular material from said storage hopper through said casing, one end of said tube providing an air inlet opening thereinto and the other end of said tube providing an air outlet opening therefrom, the intermediate section of said tube being disposed within said casing and having a valve port provided in the bottom thereof, a sheet-like member arranged in covering relation with said bottom opening and adjacent to the upper side of said bottom cover, said member including a central portion disposed below said valve port and constituting a valve element cooperating therewith, said member also including an outer boundary portion disposed between the bottom of said casing and the outer portion of said bottom cover and constituting a sealing gasket with respect thereto, said member further including an intermediate portion disposed between said central portion and said outer boundary portion and constituting a diaphragm accommodating selective movements of said valve element into open and closed positions with respect to said valve port, whereby the interior of said tube is in communication with the lower portion of said casing when said valve element occupies its open position with respect to said valve port and the interior of said tube is cut-off from communication with the lower portion of said casing when said valve element occupies its closed position with respect to said valve port, a fixture communicating with said other end of said tube and adapted to be connected to a suction conduit, whereby conveying air may be supplied through said air inlet opening into said tube and then through said air outlet opening into the suction conduit connected to said fixture with the result that the granular material in said storage hopper is unloaded therefrom into said casing and proceeds therefrom through said valve port with said valve element in its open position and into said tube and is thus conveyed with the conveying air in said tube into the suction conduit connected to said fixture, said member cooperating with said bottom cover to define a chamber therebetween, said diaphragm having a lower position actuating said valve element into its open position with respect to said valve port and an upper position actuating said valve element into its closed position with respect to said valve port, the upper side of said valve element and the upper side of said diaphragm being subject to the air pressure in the lower portion of said casing and the lower side of said valve element and the lower side of said diaphragm being subject to the air pressure in said chamber, the upper side of said valve element and the upper side of said diaphragm also being subject to the weight of granular material in the lower portion of said casing so long as there is granular material in said storage hopper to be unloaded therefrom, said diaphragm having a hole therein that is located well outwardly from said valve port and said valve element, and means including a porous plug arranged in said hole for defining a restricted passage between the lower portion of said casing and said chamber, whereby the absence of suction in said tube concurrently with or without granular material in the lower portion of said casing subjects the upper side of said valve element and the upper side of said diaphragm and said plug to relative high air pressure so that said chamber is subject to relatively high air pressure with the result that said diaphragm is operated into its lower position, and whereby suction in said tube concurrently with the presence of granular material in the lower portion of said casing subjects the upper side of said valve element and the upper side of said diaphragm and said plug to relatively low air pressure so that said chamber is subject to relatively low air pressure with the result that said diaphragm is operated into its lower position, and whereby suction in said tube concurrently with the absence of granular material in the lower portion of said casing subjects the upper side of said valve element to relatively low air pressure and subjects the upper side of said diaphragm and said plug to relatively high air pressure so that said chamber is subject to relatively high air pressure with the result that said diaphragm is operated into its upper position.

10. The apparatus for storing granular material set forth in claim 9, wherein said porous plug has the general form of a grommet removably secured in place in the hole in said diaphragm.

11. The apparatus for storing granular material set forth in claim 9, wherein said porous plug is formed of a material selected from the class consisting of ceramic materials, plastic materials, and sintered metal oxide materials.

No references cited.